Figure 1:
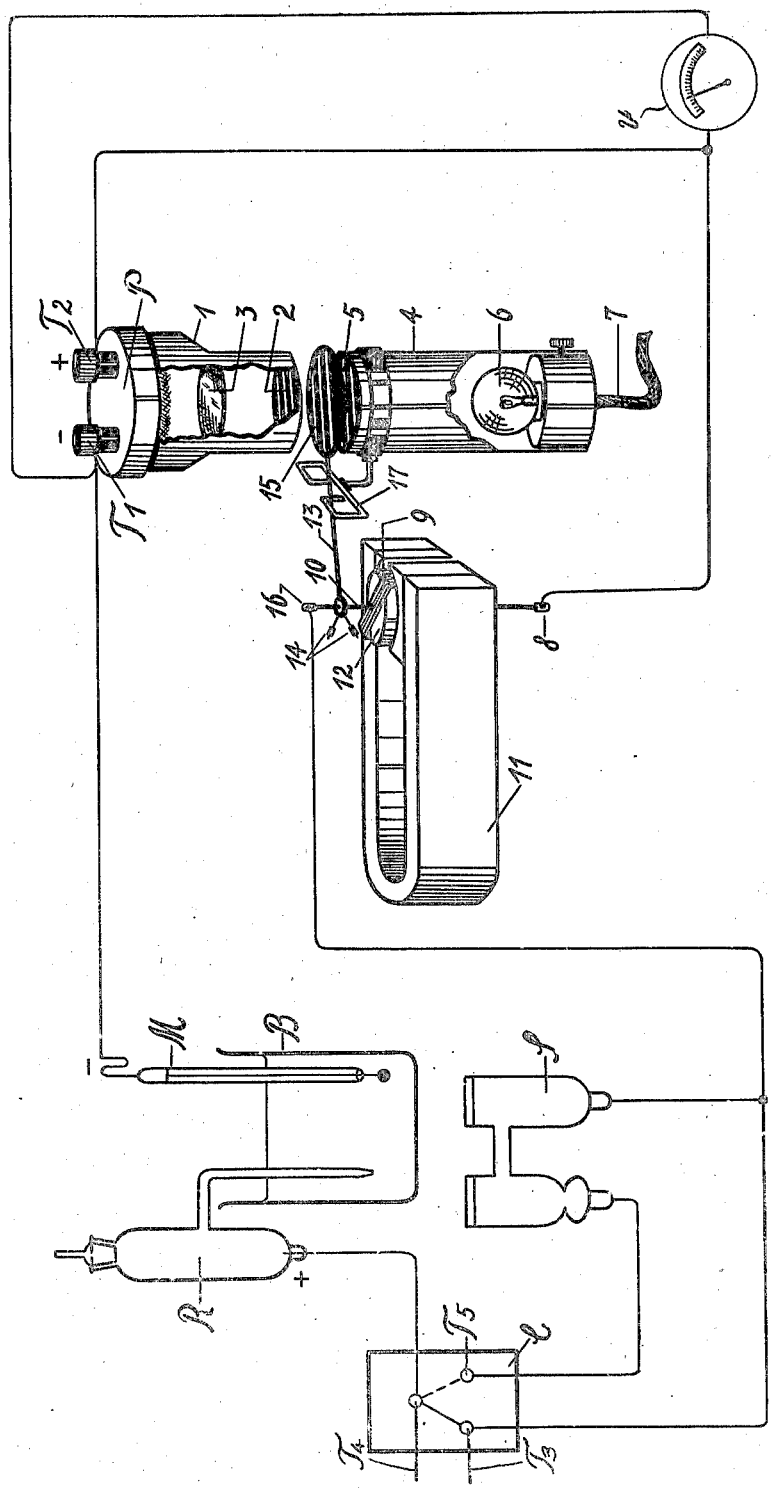

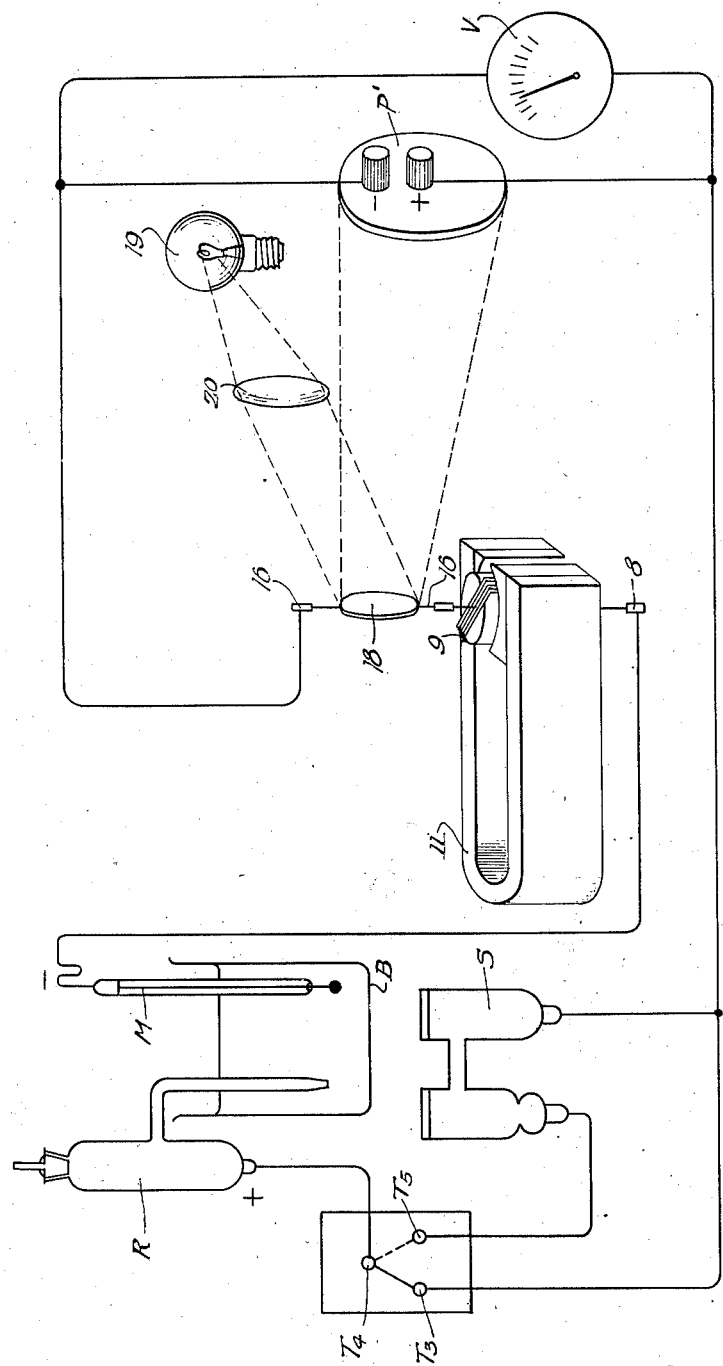

Patented May 31, 1938

2,119,374

UNITED STATES PATENT OFFICE 2,119,374

METHOD OF AND APPARATUS FOR MEASURING ELECTRIC VALUES

Peter Wulff, Pullach, near Munich, and Willy Kordatzki, Solln, near Munich, Germany Application July 19, 1935, Serial No. 32,308, In Germany July 25, 1934

8 Claims. (Cl. 175—183)

This invention relates to a method of and apparatus for measuring electric values.

It is an object of the invention to devise a method and apparatus suitable for the same for extremely accurate determination of electromotive forces by the opposition system, in such manner that it is not necessary to cause a disturbing flow of current through that element in the circuit the potential of which is to be determined.

It is another object of the invention to provide as a source of potential which may serve as a reference or standard element in respect of the unknown source of potential, the value of which is to be determined, a source, the potential of which may be varied gradually and continually without any abrupt changes of potential in this reference source being produced.

Another object of the invention is to utilize a photoelectric cell as this standard or reference source of potential opposing that source of potential whose value is to be determined.

With these and numerous other objects in view, embodiments of the invention, as far as it relates to the apparatus, are illustrated in the accompanying drawings, and reference is made to the drawings in the following specification which describes the improved method and apparatus for determining electric values.

In the drawings:

Fig. 1 is a diagrammatic representation of an assembly of apparatus, as it may be used for determining the concentration of hydrogen ions; and Fig. 2 illustrates diagrammatically a modified arrangement.

For the purpose of measuring electromotive forces the opposition method utilizing a potentiometer is of particular value in all of those cases in which the source of potential must be tested in the absence of any disturbing flow of current from the source. This condition obtains, for instance, when determining the potentials of electrodes which are used for investigating the concentration of hydrogen ions. (Determination of pH values). It is also of importance in determining the potentials of thermo-electric cells or batteries.

The determination of electric potentials by one method of opposition, namely the so-called method of compensation, requires a source of electric potential should be variable continually, the various potential values merging into each other gradually in the form of a series of values, which may be graphically represented as a line having no steps, shoulders or kinks. During the measuring operation itself, the value of this variable potential gradually is altered, until it accurately equals the value of the unknown potential to be determined. This condition may be observed, for instance, by watching the deflection of a zero instrument located in the compensating circuit and recognizing the presence of this condition when this zero instrument indicates zero. The methods which have been in use heretofore, as for instance, the method of Du Bois-Reymond, Poggendorff, utilize the compensation voltages measured by means of a slide wire between terminals, at least one of which is movable along the slide wire.

It has now been discovered that a photoelectric cell may be used to great advantage as a source of potential without any auxiliary battery. The photoelectric cell forms a source of a "continually variable" voltage. A photoelectric cell of this type is for instance a primary photoelectric battery composed of layers of different materials. This cell has the advantage of directly generating the counter-voltage necessary for compensating the unknown potential to be measured, provided it is subjected to a variable illumination the intensity of which may be varied in accordance with the deflections of an indicating instrument located in the circuit.

For reducing this method to practice, the following arrangement may be made. The circuit element whose unknown voltage is to be determined is connected up in opposition to the photoelectric cell in such manner that the potential of the photoelectric cell, when illuminated, is directed counter to the unknown voltage. In this circuit there must be located, furthermore, a highly sensitive electric instrument, for instance, a galvanometer or a capillary electrometer. The movable part of this instrument is caused to vary the illumination of the photoelectric cell as for instance by a diaphragm between the source of light and the cell, or by deflection of the rays of light. This deflection or diaphragm action may strengthen or weaken the intensity of the light striking the photoelectric cell.

Now, if the unknown voltage is greater than the voltage of the photoelectric cell connected in opposition thereto, a flow of current is set up in the circuit. The galvanometer then shows this by a deflection of the indicator. According to the present invention, this deflection is utilized for increasing the intensity of illumination energizing the photoelectric cell, and the result then will be that the voltage of the photoelectric cell will be increased until it almost completely balances the unknown voltage.

If the unknown voltage is smaller than the opposing voltage of the photoelectric cell, the galvanometer will be deflected in the opposite direction and producing thereby according to the present invention a reduction in the intensity of illumination, and hence, a reduction in the voltage of the photoelectric cell until practically a complete compensation or equilibrium is established with the unknown voltage.

A fairly strong current may be delivered from photoelectric cells of this type. Hence, a simple and cheap voltmeter of a high ohmic resistance shunted directly to the photoelectric cell will indicate the voltage of this cell, without making it necessary that the source of unknown voltage itself be utilized to furnish the current.

The advantages of this new method reside in the simplicity of the apparatus and in the possibility of directly reading the values of the voltage without being compelled to take any current from that source of voltage whose potential is to be determined. Furthermore, no auxiliary sources of voltage are required.

Fig. 1 shows diagrammatically the apparatus for measuring a voltage by automatic opposition. Here the electromotive force whose unknown potential is to be determined is derived from a pair of electrodes, M being the electrode to be tested and R being a reference or standard electrode. The two electrodes are immersed partly in a beaker or other container B containing a solution, the pH value of which is to be determined.

The measuring electrode M constituting the negative pole of the series of electrodes is connected with the negative pole T1 of a photoelectric cell P preferably of the multiple occluded layer type. This photoelectric cell or battery P is inserted in the upper opening of a tube 1. The lower end of this tube is closed by a circular diaphragm 2 in the form of a disc provided with a plurality of parallel slits. A frosted pane of glass 3 may be disposed between the photoelectric cell P and the diaphragm 2. In alinement with the tube 1 a second tube 4 has an opening which also is closed by a diaphragm 5 provided with parallel slits. The number and size of the slits in the diaphragm 5 corresponds to the number and size of slits in the diaphragm 2. The slits in these two diaphragms always are in registry with each other, so that light may pass through the same. An electric lamp 6 whose current supply is indicated at 7 is inserted into the lower end of the tube 4.

The positive pole T2 of the photoelectric cell P is connected to the terminal 8 at the foot end of a shaft 10, from which terminal current may flow to the electromagnetically actuatable coil 9, the other coil terminal 16 being near the upper end of the shaft. The coil 9 is for instance a part of a D'Arsonval type instrument and is located between the pole shoes of a permanent magnet 11 and about the iron core 12. A pointer 13 secured to the coil supporting shaft 10 is suitably counterbalanced by weights 14. A bracket 17 having two projections serves for limiting the deflection of the pointer 13 in either direction. This type of instruments is very well known and has a strong damping or "dead beat" characteristic.

The pointer 13 has at its free end a diaphragm 15 also provided with slits formed therein in a manner similar to those of diaphragms 2 and 5, and the diaphragm 15 swings in a plane between the other diaphragms. The spacing of these diaphragms is shown highly magnified in the drawings. In actuality they are separated from each other a distance of a few millimeters only.

The terminal 16 of the coil is connected with one pole of a standard cell or normalizing element S and is also connected with a terminal T3 of a double-throw switch C. The other terminal T5 of this switch is connected with the other pole of the standard cell S. The pole T4 of the switch C is connected with the reference electrode R. In one position of the switch C the two terminals T3 and T4 are connected and current flows from the reference electrode R directly to the coil 9. In the other position, connecting the poles T4 and T5, the current flows from the reference electrode R through the standardization cell S to the coil 9. The insertion of the auxiliary electromotive force in the form of standardization cell S will alter the unknown voltage by a predetermined value.

Hence, if the unknown voltage should be greater than the maximum value measurable in this apparatus, it may be reduced by connecting the standardization cell in opposition thereto, thereby reducing the unknown voltage to a known extent.

A voltmeter is shunted to the terminals T1 and T2 of the photoelectric cell P. This voltmeter may have a dial indicating any desired units;— it may be directly graduated in pH values or, for instance, in temperature units or degrees when it is desired to determine the temperature by means of thermoelectric cells.

When the three diaphragms 2, 15, 5 are in such relation to each other that the slits in diaphragm 15 register with the slits in the diaphragm 2 and 5, the greatest quantity of light will pass from the lamp 6 to the photoelectric cell, and the latter will indicate the highest possible voltage. Upon rotating the coil 9 and thereby moving the diaphragm 15 out of registry, any lateral displacement of the diaphragm 15, even though very slight, will suffice to bring about a very considerable variation in the intensity of illumination of the photoelectric cell.

When utilizing this system, the circuit, including the unknown potential, the photoelectric cell and the rotary coil, will automatically adjust itself to a condition of equilibrium, in which the diaphragm 15 occupies a position in respect of the diaphragms 2 and 5, that the voltage of the photoelectric cell practically completely compensates for or balances the unknown voltage. If this unknown voltage also should vary, the rotary coil 9 will also move, thereby swinging the diaphragm 15 again until compensation or balance is restored between the voltage of the photoelectric cell and the unknown voltage.

Fig. 2 illustrates a modified arrangement of the means for energizing the photoelectric cell P. The measuring electrode M is connected with the terminal 8 which in the same manner as in Fig. 1 is connected with one end of the coil 9 the other end of which is connected to the upper terminal 16 on the shaft 10. The terminal 16 is connected with the negative pole of the photoelectric cell P' and also with one terminal of the measuring instrument V. The positive pole of the photoelectric cell and the other terminal of the measuring instrument V are connected with each other and with the standardization cell S. A reflector 18 is fixedly secured to the shaft 10 which is rotated with the coil 9. A lamp 19 throws its light through the lens 20 upon the reflector 18 from which it is reflected upon the photoelectric cell P'. The illumination of the cell P' and thereby the potential of the latter is varied whenever the coil 9 moves in response to any change in the circuit which tends to disturb the balance between the voltage of the photoelectric cell and the voltage to be measured.

In this manner the photoelectric cell adjusts itself automatically, continually and instantaneously to a voltage which practically is the same as the unknown voltage; the latter value is, therefore, the voltage which may be indicated directly by the voltmeter V.

We claim:

1. A method of determining the value of potentials by automatic opposition, which consists in energizing by illumination a photoelectric cell to produce a voltage and current without auxiliary electromotive force, connecting the unknown potential in opposition to the photoelectric cell and actuating by the current resulting from this connection an electromagnetically movable coil, altering the intensity of the illumination, energizing the photoelectric cell, by and in accordance with the movement of said coil, and continuing the automatic regulation until the potential of the photoelectric cell varied by the variable illumination has assumed a value practically equal to the value of the unknown potential connected in opposition thereto, at which time the movement of the electromagnetically movable coil ceases, and determining the said potential of the photoelectric cell by a voltmeter shunted in a known way to the poles of the photoelectric cell.

2. Apparatus for determining an electromotive force, comprising within an electric circuit in serial connection the element having the unknown electromotive force, a photoelectric cell adapted to be energized by light and to supply current, the cell being connected in opposition to the said element, a voltmeter shunted to the photoelectric cell, a practically dead-beat electromagnetically movable coil and another element connected with said movable coil and insertible into the path of light energizing the photoelectric cell to vary the intensity of illumination of the photoelectric cell.

3. An apparatus for determining an electromotive force comprising within an electric circuit in serial connection the element having the unknown electromotive force, a battery of serially connected photoelectric cells adapted to be energized by light, a voltmeter connected in a known way with the poles of the battery of photoelectric cells, an electromagnetically movable coil of dead-beat characteristics, and an element attached to said coil and adapted to move into the path of light energizing the battery of photoelectric cells so as to vary by its movement the intensity of the energizing illumination of said battery.

4. An apparatus for determining an electromotive force in an electric circuit, comprising in a circuit in serial connection the element having the unknown electromotive force, a photoelectric cell energizable by light and adapted to supply current, the cell being connected in opposition to said element and an electromagnetically actuated coil, a voltmeter shunted to the photoelectric cell, and a reflector attached to said coil, the reflector being adapted to direct the light under varying angles depending upon the extent of movement of said electromagnetic coil upon the photoelectric cell in said circuit.

5. An apparatus for determining an electromotive force in an electric circuit, comprising in serial connection the element having the unknown electromotive force, a photoelectric cell connected in opposition to said unknown electromotive force, a voltmeter shunted in a known way to said photoelectric cell, and an electromagnetically actuatable coil, a source of light, a stationary diaphragm for said photo-cell, a stationary diaphragm in opposition to said source of light, said diaphragms being provided with slits, the slits of the two diaphragms being in registry with each other, a third diaphragm movable with said electromagnetically actuated coil, said third diaphragm also being provided with slits adapted to permit the passage or obstruct respectively to a variable extent the passage of light from the source of light to the photoelectric cell through said diaphragms.

6. An apparatus for determining an electromotive force in an electric circuit comprising in serial connection an element having the unknown electromotive force, an auxiliary element of electromotive force adapted to be connected with the element of the unknown electromotive force for increasing and decreasing respectively said unknown electromotive force, a photoelectric cell energizable by light to supply current and connected in opposition to the said element, a voltmeter shunted in a known way to the photoelectric cell, an electromagnetically actuated coil of dead-beat characteristics, and an element connected with the said coil and located in the path of light energizing the photoelectric cell and adapted to vary the intensity of illumination of the photoelectric cell upon actuation of said coil.

7. A method of determining the value of an electric potential, which consists in energizing a source of electrical potential to produce voltage and current without auxiliary electromotive force, connecting the unknown potential in opposition to the said source, altering the energization of said source of electrical potential by a continual series of differential increments and decrements and controlling said alterations in accordance with the difference between the unknown potential and the potential of said source.

8. In an electric measuring method, the steps of energizing by illumination a photoelectric cell to produce a voltage and current without auxiliary electromotive force, connecting the element whose value is to be determined to the photoelectric cell in such a manner that the current passing through said element is opposed to the current produced by said photoelectric cell, and passing the current resulting from this connection through an electromagnetically movable coil which is actuated thereby, varying the illumination of the photoelectric cell by and in accordance with the movement of said coil, until the potential of the photoelectric cell varied by the variable illumination has assumed a value practically equal to the voltage drop caused by the current in said element, at which time the movement of said electromagnetically movable coil ceases, and then measuring the potential of the photoelectric cell by a voltmeter, said last named measurement forming an indication of the value of said element.

PETER WULFF.
WILLY KORDATZKI.